(12) United States Patent
Jia et al.

(10) Patent No.: US 12,175,897 B2
(45) Date of Patent: Dec. 24, 2024

(54) CONNECTING DEVICE FOR LED BOXES AND LED DISPLAY DEVICE

(71) Applicant: LEYARD OPTOELECTRONIC CO., LTD., Beijing (CN)

(72) Inventors: Jinxia Jia, Beijing (CN); Zhiyong Liu, Beijing (CN)

(73) Assignee: LEYARD OPTOELECTRONIC CO., LTD., Beijing (CN)

( * ) Notice: Subject to any disclaimer, the term of this patent is extended or adjusted under 35 U.S.C. 154(b) by 373 days.

(21) Appl. No.: 17/655,878

(22) Filed: Mar. 22, 2022

(65) Prior Publication Data

US 2022/0343811 A1 Oct. 27, 2022

(30) Foreign Application Priority Data

Apr. 25, 2021 (CN) .......................... 202110450551.8

(51) Int. Cl.
*G09F 9/302* (2006.01)
*G06F 1/18* (2006.01)
*H01R 13/24* (2006.01)

(52) U.S. Cl.
CPC ............ *G09F 9/3026* (2013.01); *G06F 1/189* (2013.01); *H01R 13/2421* (2013.01)

(58) Field of Classification Search
CPC .......... G09F 9/3026; G09F 9/33; G09F 9/302; G06F 1/189; G06F 1/1601; H01R 13/2421; H01R 13/60; H01R 13/502; H01R 24/005; H05K 5/0018
USPC ....................................................... 439/490
See application file for complete search history.

(56) References Cited

U.S. PATENT DOCUMENTS

| 10,273,994 | B1* | 4/2019 | Foster | G09F 9/3026 |
| 10,980,397 | B1* | 4/2021 | Ubbesen | G06F 1/1656 |
| 2013/0010408 | A1* | 1/2013 | Lin | G09F 9/33 |
| | | | | 361/679.01 |
| 2013/0095685 | A1* | 4/2013 | Rassoolkhani | H01R 13/639 |
| | | | | 439/345 |

(Continued)

FOREIGN PATENT DOCUMENTS

| CN | 103414056 A | 11/2013 |
| CN | 203982709 U | 12/2014 |
| DE | 102018108483 B3 | 8/2019 |

OTHER PUBLICATIONS

The extended European search report of the corresponding EP patent application No. 22164156.6, mail date Sep. 9, 2022.

*Primary Examiner* — Alexander Gilman
(74) *Attorney, Agent, or Firm* — Samson G. Yu (57) ABSTRACT

A connecting device for light emitting diode (LED) boxes and an LED display device. The connecting device for LED boxes includes: a first connecting assembly, which includes a first plugging portion; and a second connecting assembly, which includes: a fixed seat, a second plugging portion movably arranged on the fixed seat and having an extending position in a plug-in cooperation with the first plugging portion and a retracting position separated from the first plugging portion, a driving portion movably arranged on the fixed seat, wherein the driving portion is connected with the second plugging portion through a linkage device, so as to drive the second plugging portion to move between the retracting position and the extending position, and elastic reset member arranged between the fixed seat and the driving portion.

13 Claims, 7 Drawing Sheets

(56) References Cited

U.S. PATENT DOCUMENTS

| | | | | |
|---|---|---|---|---|
| 2013/0232833 A1* | 9/2013 | Davis | .................... | G09F 19/226 |
| | | | | 40/601 |
| 2013/0271940 A1* | 10/2013 | Cope | .................... | H05K 5/0217 |
| | | | | 361/809 |
| 2014/0301088 A1* | 10/2014 | Lu | ........................... | G09F 9/33 |
| | | | | 362/382 |
| 2016/0255731 A1* | 9/2016 | Ran | ...................... | A47B 97/001 |
| | | | | 361/807 |
| 2017/0220310 A1* | 8/2017 | Hochman | .......... | H01R 13/6205 |
| 2018/0315358 A1* | 11/2018 | Schmidt | .................... | G09F 9/33 |
| 2019/0123464 A1* | 4/2019 | Pucher | .................. | H01R 12/87 |
| 2019/0146553 A1* | 5/2019 | Azam | ................... | G06F 1/3218 |
| | | | | 713/323 |
| 2019/0296497 A1* | 9/2019 | Chang | ....................... | G06F 3/02 |
| 2019/0366101 A1* | 12/2019 | Mcsherry | ............... | H01R 24/60 |
| 2020/0211426 A1* | 7/2020 | Tian | ...................... | G06F 1/1601 |
| 2020/0225716 A1* | 7/2020 | Reed | ................... | H05K 7/1487 |
| 2020/0375039 A1* | 11/2020 | Mudd | ................. | H05K 5/0204 |
| 2021/0053504 A1* | 2/2021 | Kato | ..................... | G06F 1/1601 |
| 2021/0124543 A1* | 4/2021 | Joo | ....................... | G06F 1/1641 |

* cited by examiner

CONNECTING DEVICE FOR LED BOXES AND LED DISPLAY DEVICE

CROSS-REFERENCE TO RELATED APPLICATION

The present disclosure claims priority to patent application No. 202110450551.8, filed to the China National Intellectual Property Administration on Apr. 25, 2021 and entitled "CONNECTING DEVICE FOR LED BOXES AND LED DISPLAY DEVICE".

TECHNICAL FIELD

The disclosure relates to a technical field of light emitting diode (LED) display, and particularly relates to a connecting device for LED boxes and an LED display device.

BACKGROUND

According to technology known to inventors, after light emitting diode (LED) boxes are assembled, wires between the boxes need to be manually plugged for cascading. During assembling, male connector and female connector of adjacent boxes are plugged to realize cascading of power and signals of the boxes in a column. For a sake of aesthetic and protection of cascade wires, in most cases, the cascade wires are hidden in the boxes, such that a rear housing or part of the rear housing of each box needs to be opened during wiring and to be closed after wiring. In this way, steps are complex and cumbersome, which lower an assembly efficiency of the boxes.

In order to solve the above problem, some boxes currently adopt a solution that connectors are fixed on side walls of the boxes respectively, which solves the problem that cascading of the wires between the boxes needs to be manually completed. However, when the boxes are assembled, lamps may be impacted due to collision between the boxes.

SUMMARY

The main objective of the disclosure is to provide a connecting device for light emitting diode (LED) boxes and an LED display device, so as to solve the problem that lamp beads are prone to impact when wires of LED boxes are connected in a technology known to inventors.

In order to realize the above objective, one aspect of the disclosure provides a connecting device for LED boxes. The connecting device includes: a first connecting assembly, which includes a first plugging portion; and a second connecting assembly, which includes: a fixed seat, a second plugging portion movably arranged on the fixed seat and having an extending position in a plug-in cooperation with the first plugging portion and a retracting position separated from the first plugging portion, a driving portion movably arranged on the fixed seat, where the driving portion is connected with the second plugging portion through a linkage device, so as to drive the second plugging portion to move between the retracting position and the extending position, and an elastic reset member arranged between the fixed seat and the driving portion.

Further, the linkage device includes a swinging rod swingably arranged on the fixed seat, wherein a first end of the swinging rod is movably connected with the second plugging portion, and a second end of the swinging rod is movably connected with the driving portion.

Further, the connecting device further includes a first sliding groove and a first axis pin arranged in the first sliding groove, wherein one of the first axis pin and the first sliding groove is arranged at the first end of the swinging rod, and the other one of the first axis pin and the first sliding groove is arranged on the second plugging portion. The fixed seat further includes a first guide structure, and the second plugging portion is guided by the first guide structure to move between the retracting position and the extending position.

Further, the connecting device further includes a second sliding groove and a second axis pin arranged in the second sliding groove, wherein one of the second axis pin and the second sliding groove is arranged at the second end of the swinging rod, and the other one of the second axis pin and the second sliding groove is arranged on the driving portion. The fixed seat further includes a second guide structure, and the driving portion is guided by the second guide structure to move.

Further, each elastic reset member is a spring, the driving portion includes a driving rod and an abutting portion positioned at a first end of the driving rod, the driving rod is arranged in the second guide structure, and the spring is sleeved on the driving rod and is positioned between the fixed seat and the abutting portion.

Further, the driving portion includes the driving rod and a blocking portion arranged at a second end of the driving rod, the driving rod is arranged in the second guide structure, the second axis pin is arranged at the second end of the swinging rod, and the second sliding groove is provided at the blocking portion.

Further, the first guide structure is an accommodating housing, the second plugging portion is arranged in the accommodating housing, a third sliding groove is provided on the accommodating housing, and the first axis pin penetrates the third sliding groove.

Further, the connecting device further includes a pin hole and a third axis pin penetrating the pin hole, wherein one of the pin hole and the third axis pin is arranged on the fixed seat, and the other one of the pin hole and the third axis pin is arranged on the swinging rod.

Another aspect of the disclosure provides an LED display device. The LED display device includes: a first LED box, a second LED box and a connecting device arranged between the first LED box and the second LED box, wherein the connecting device is the above connecting device.

Further, the first connecting assembly of the connecting device is arranged on the first LED box, the second connecting assembly of the connecting device is arranged on the second LED box, a side wall of the second LED box is provided with an opening for the second plugging portion and the driving portion of the connecting device to pass through, and the fixed seat of the connecting device is an independent component or the fixed seat of the connecting device is formed by part of structure of the second LED box.

By using a technical solution of the disclosure, the connecting device includes the first connecting assembly and the second connecting assembly. The first connecting assembly includes the first plugging portion, the second connecting assembly includes the second plugging portion, the first plugging portion and the second plugging portion are arranged on two adjacent LED boxes respectively, and the first plugging portion and the second plugging portion are able to cooperate with each other in a pluggable manner, so as to realize a power supply connection or a signal connection between the LED boxes. The second connecting assembly further includes the fixed seat and the driving portion, wherein the fixed seat is fixed on the LED box. The driving portion drives the second plugging portion to move between the retracting position and the extending position through the linkage device. When two adjacent LED boxes are connected, the driving portion moves inwards, so as to drive the second plugging portion to switch to the extending position, and the second plugging portion extends out of the LED box to connect with the first plugging portion in a pluggable manner. When two adjacent LED boxes are disconnected, under an action of the elastic reset member, the driving portion extends outwards, so as to drive the second plugging portion to switch to the retracting position, and the second plugging portion retracts into the LED box, to protect the second plugging portion. Meanwhile, the second plugging portion does not protrude out of a side wall of the LED box, and when the LED boxes are assembled, the second plugging portion will not collide with a lamp plate of the LED box, thereby preventing lamp beams from falling. Moreover, when the LED boxes are assembled, the elastic reset member plays a buffering role, such that the LED boxes won't collide with each other, and further the lamp beads won't be impacted. Therefore, the technical solution of the disclosure effectively solves a problem that lamp beads are prone to be impacted when wires of LED boxes are connected in a technology known to inventors.

BRIEF DESCRIPTION OF THE DRAWINGS

The drawings, forming part of the disclosure, of the description serve to provide a further understanding of the disclosure, and illustrative embodiments of the disclosure and description of the illustrative embodiments serve to explain the disclosure and are not to be construed as improper limiting the disclosure. In the drawings.

The above drawings include the following reference numerals:

1. first connecting assembly, 2. second connecting assembly, 3. first LED box, 4. second LED box, 10. first plugging portion, 20. fixed seat, 21. first guide structure, 22. second guide structure, 30. second plugging portion, 40. driving portion, 41. driving rod, 42. abutting portion, 43. blocking portion, 50. linkage device, 51. swinging rod, 60. elastic reset member, 71. first sliding groove, 72. first axis pin, 73, second sliding groove, 74. second axis pin, 75. third sliding groove, 76. pin hole and 77. third axis pin.

DETAILED DESCRIPTION OF THE EMBODIMENTS

The technical solutions of the embodiments of the disclosure will be clearly and completely described below with reference to the drawings of the embodiments of the disclosure. Apparently, the embodiments described are merely part rather than all of the embodiments of the disclosure. The following description of at least one illustrative embodiment is merely illustrative and does serve as any limitation of the disclosure and its application or uses. On the basis of the embodiments of the disclosure, all other embodiments obtained by those of ordinary skill in the art without making inventive efforts should fall within the protection scope of the disclosure.

It should be noted that the terms used herein are merely for describing the specific implementations and are not intended to limit the illustrative implementations according to the disclosure. As used herein, singular is also intended to include plural unless the context clearly points out singular or plural. In addition, it should be understood that terms "include" and/or "comprise", used in the description, indicate the presence of features, steps, operations, devices, components and/or combinations of the foregoing.

Unless specifically stated otherwise, relative arrangements, numerical expressions and values of the components and steps stated in these embodiments do not limit the scope of the disclosure. At the same time, it should be understood that the sizes of the various portions shown in the accompanying drawings are not drawn according to an actual scale for ease of description. Technique, methods and equipment known to those of ordinary skill in the related art may not be discussed in detail, but should be considered as part of the authorized description where appropriate. In all examples shown and discussed herein, any particular value should be interpreted as illustrative only and not as limiting. Thus, other examples of the illustrative embodiments may have different values. It should be noted that similar numerals and letters denote similar items in the following accompanying drawings, and therefore, once an item is defined in one figure, it does not need to be further discussed in the subsequent figures.

As shown in FIGS. 1-4, FIG. 8, FIG. 9 and FIG. 11, an embodiment of a connecting device for light emitting diode (LED) boxes of the disclosure includes a first connecting assembly 1 and a second connecting assembly 2. The first connecting assembly 1 includes a first plugging portion 10, and the second connecting assembly 2 includes a fixed seat 20, a second plugging portion 30, a driving portion 40, a linkage device 50 and an elastic reset member 60. The second plugging portion 30 is movably arranged on the fixed seat 20 and has an extending position in a plug-in cooperation with the first plugging portion 10 and a retracting position separated from the first plugging portion 10. The driving portion 40 is movably arranged on the fixed seat 20, and the driving portion 40 is connected with the second plugging portion 30 through the linkage device 50, so as to drive the second plugging portion 30 to move between the retracting position and the extending position. The elastic reset member 60 is arranged between the fixed seat 20 and the driving portion 40.

By using a technical solution of the embodiment, the connecting device includes the first connecting assembly 1 and the second connecting assembly 2. The first connecting assembly 1 includes the first plugging portion 10, the second connecting assembly 2 includes the second plugging portion 30, the first plugging portion 10 and the second plugging portion 30 are arranged on two adjacent LED boxes respectively, and the first plugging portion 10 and the second plugging portion 30 are able to cooperate with each other in a pluggable manner, so as to realize a power supply connection or a signal connection between the LED boxes. The second connecting assembly 2 further includes the fixed seat 20 and the driving portion 40, wherein the fixed seat 20 is fixed on the LED box. The driving portion 40 drives the second plugging portion 30 to move between the retracting position and the extending position through the linkage device 50. When two adjacent LED boxes are connected, the driving portion 40 moves inwards, so as to drive the second plugging portion to switch to the extending position 30, and the second plugging portion 30 extends out of the LED box to connect with the first plugging portion 10 in a pluggable manner. When two adjacent LED boxes are disconnected, under an action of the elastic reset member 60, the driving portion 40 extends outwards, so as to drive the second plugging portion 30 to switch to the retracting position. And the second plugging portion 30 retracts into the LED box, such that the second plugging portion 30 does not protrude out of a side wall of the LED box, and the second plugging portion 30 is protected. Meanwhile, when the LED boxes are assembled, the second plugging portion 30 won't collide with a lamp plate of the LED box, thereby preventing lamp beams from falling. Moreover, when the LED boxes are assembled, the elastic reset member 60 plays a buffering role, such that the LED boxes won't collide with each other, and further the lamp beads won't be impacted. Therefore, the technical solution of the disclosure effectively solves a problem that lamp beads are prone to be impacted when wires of LED boxes are connected in a technology known to inventors.

As shown in FIGS. 1-4, the linkage device 50 includes a swinging rod 51 swingably arranged on the fixed seat 20, wherein a first end of the swinging rod 51 is movably connected with the second plugging portion 30, and a second end of the swinging rod 51 is movably connected with the driving portion 40. The two ends of the swinging rod 51 are connected with the second plugging portion 30 and the driving portion 40 respectively, and the driving portion 40 drives the second plugging portion 30 to move between the retracting position and the extending position through the swinging rod 51. Compared with other linkage devices, the swinging rod 51 has advantages of simple structure and reliable transmission. Moreover, since the swinging rod 51 is movably connected with the second plugging portion 30 and the driving portion 40, the swinging rod 51, the second plugging portion 30 and the driving portion 40 will not get stuck during movement.

As shown in FIGS. 1-5, the connecting device further includes a first sliding groove 71 and a first axis pin 72 arranged in the first sliding groove 71. The fixed seat 20 further includes a first guide structure 21, and the second plugging portion 30 is guided by the first guide structure 21 to move between the retracting position and the extending position. In the embodiment, the first sliding groove 71 is provided on the second plugging portion 30, and the first axis pin 72 is arranged at the first end of the swinging rod 51. When the swinging rod 51 swings, the first axis pin 72 slides in the first sliding groove 71 to drive the second plugging portion 30 to move under a guiding of the first guide structure 21, such that the second plugging portion 30 is able to switch between the retracting position and the extending position. Preferably, the first sliding groove 71 is a strip-shaped sliding groove, a width of the first sliding groove 71 is slightly larger than a diameter of the first axis pin 72, and moreover the first sliding groove 71 is perpendicular to a moving direction of the second plugging portion 30. In this way, the first sliding groove 71 and the swinging rod 51 are easy to process, and moreover a movement of the second plugging portion 30 is reliable and smooth. In some embodiments, the first sliding groove is in other shapes, as long as the swinging rod drives the second plugging portion to move according to a predetermined track.

As shown in FIGS. 1-6, the connecting device further includes a second sliding groove 73 and a second axis pin 74 arranged in the second sliding groove 73. The fixed seat 20 further includes a second guide structure 22, and the driving portion 40 is guided by the second guide structure 22 to move. In the embodiment, the second sliding groove 73 is provided on the driving portion 40, and the second axis pin 74 is arranged on the second end of the swinging rod 51. The driving portion 40 is guided by the second guide structure 22 to move, such that the second axis pin 74 moves along the second sliding groove 73, so as to drive the swinging rod 51 to rotate. Preferably, the second sliding groove 73 is a strip-shaped sliding groove, a width of the second sliding groove 73 is slightly larger than a diameter of the second axis pin 74, and moreover the second sliding groove 73 is perpendicular to a moving direction of the driving portion 40. In this way, the swinging rod 51 is easy to process, and moreover the movement of the swinging rod 51 is reliable and smooth. In some embodiments, the second sliding groove is in other shapes, as long as the driving portion drives the swinging rod to swing.

Figure 6:
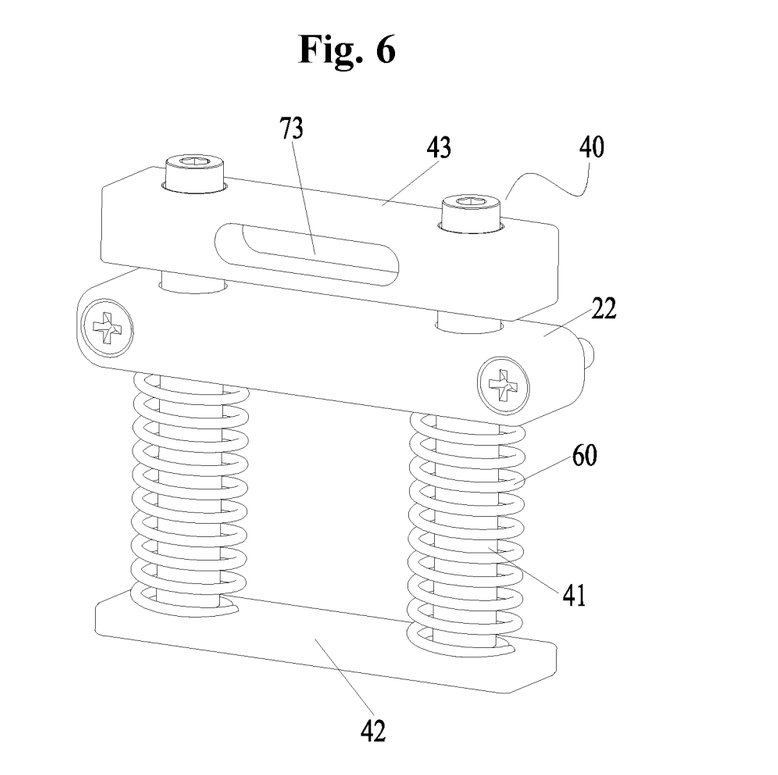
FIG. 6 shows a schematic diagram of a stereostructure of a driving portion of the connecting device in FIG. 1.
Figure 7:
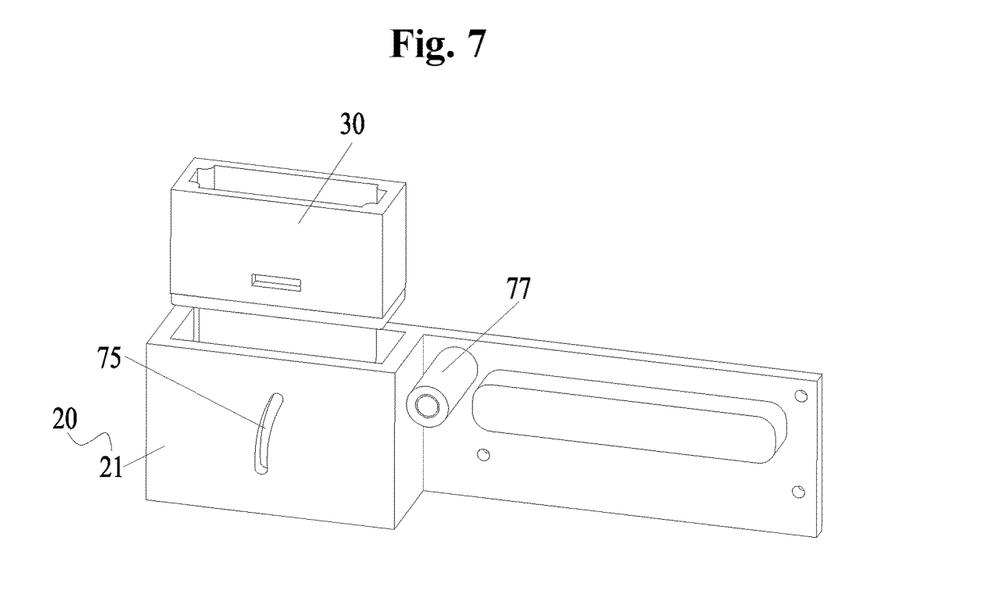
FIG. 7 shows a schematic diagram of a stereostructure of the second plugging portion and a fixed seat of the connecting device in FIG. 1.
Figure 8:
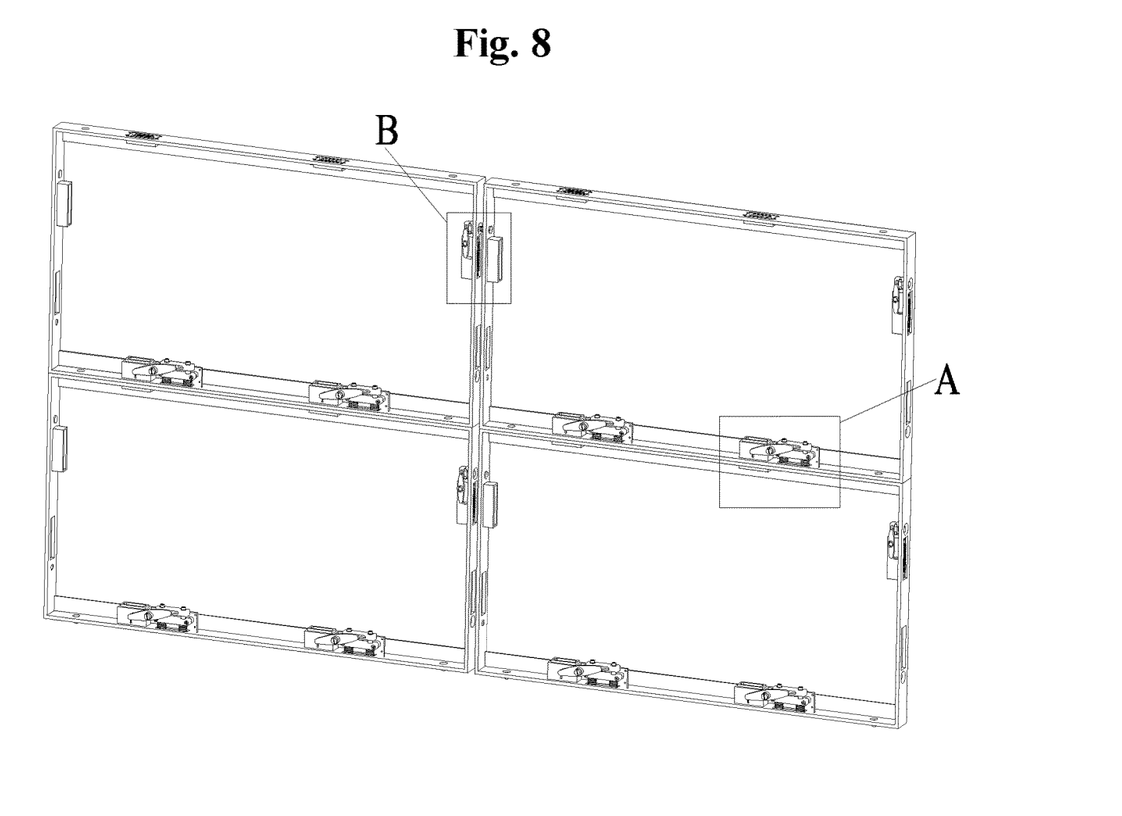
FIG. 8 shows a schematic diagram of a stereostructure according to an LED display device of the disclosure.
Figure 9:
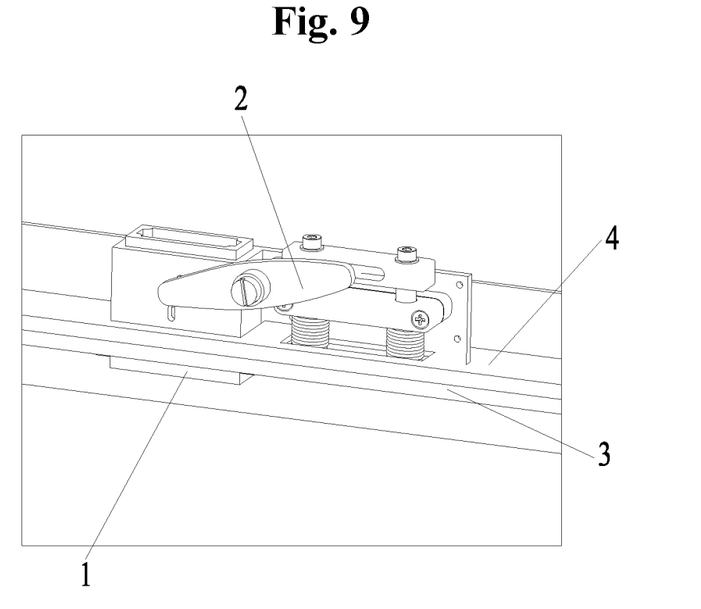
FIG. 9 shows an enlarged view of portion A of the LED display device in FIG. 8.

As shown in FIG. 6, the elastic reset member 60 is a spring, the driving portion 40 includes a driving rod 41 and an abutting portion 42 positioned at a first end of the driving rod 41, the driving rod 41 is arranged in the second guide structure 22, and the spring is sleeved on the driving rod 41 and is positioned between the fixed seat 20 and the abutting portion 42. The fixed seat 20 includes a seat body and a guide seat, the guide seat is provided with a guide hole, the driving rod 41 penetrates the guide hole, and the spring is positioned between the guide seat and the abutting portion 42. The abutting portion and the driving rod are integrally formed or are connected together by connecting members such as screws. In the embodiment, the abutting portion 42 is of a flat-plate-shaped structure. When the LED boxes are assembled, the abutting portion 42 abuts against a side wall of an adjacent LED box. The side wall of the LED box pushes the driving rod 41 to move along the guide hole on the guide seat to compress the spring, so as to drive the swinging rod 51 to rotate such that the second plugging portion 30 extends out of the LED box to cooperate with the first plugging portion 10 of the adjacent LED box in a pluggable manner. When the LED boxes are not assembled together, under an action of elastic force of the spring, the driving rod 41 moves along the guide hole on the guide seat, such that the abutting portion 42 moves away from the guide seat and the second plugging portion 30 is driven by the swinging rod 51 to retract into the LED box. In this embodiment, in order to ensure stability and reliability of a movement of the driving portion 40, two driving rods 41 are provided, and two corresponding springs are provided.

As shown in FIG. 6, the driving portion 40 includes the driving rod 41 and a blocking portion 43 arranged at a second end of the driving rod 41, the driving rod 41 is arranged in the second guide structure 22, the second axis pin 74 is arranged on the second end of the swinging rod 51, and the second sliding groove 73 is provided at the blocking portion 43. The blocking portion 43 prevents the driving rod 41 from being separated from the second guide structure 22, and specifically, the blocking portion 43 is connected with the driving rod 41 by screws.

As shown in FIGS. 1-6, the first guide structure 21 is an accommodating housing, the second plugging portion 30 is arranged in the accommodating housing, a third sliding groove 75 is provided on the accommodating housing, and the first axis pin 72 penetrates the third sliding groove 75. In the embodiment, the third sliding groove 75 is an arc-shaped sliding groove, which adapts to a moving track of the first end of the swinging rod 51 when the swinging rod 51 swings. In some embodiments, the third sliding groove is in other shapes. For example, the third sliding groove is an opening provided on the accommodating housing, as long as the accommodating housing does not hinder the first axis pin from moving.

Figure 4:
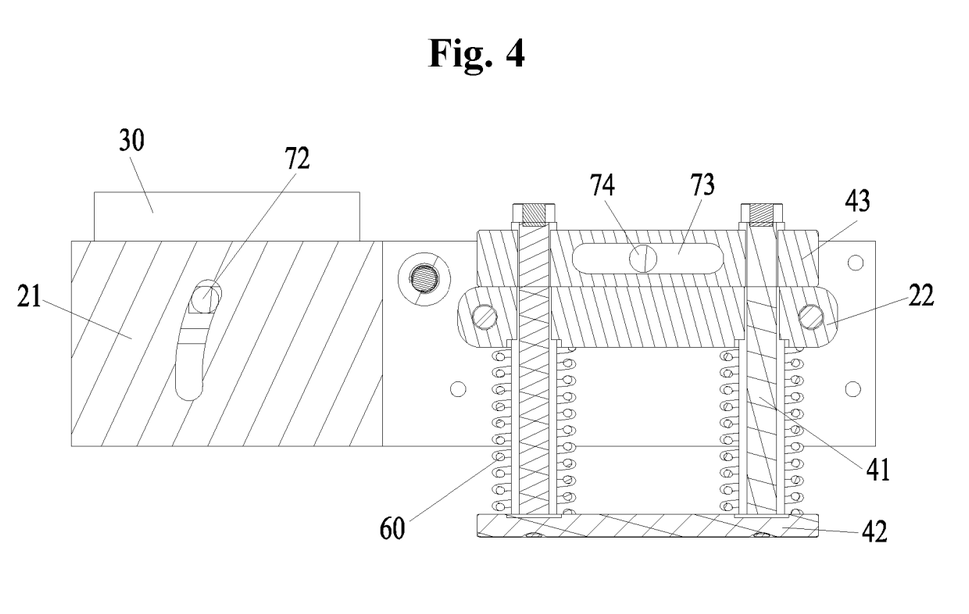
FIG. 4 shows a sectional schematic diagram of the connecting device in FIG. 3.
Figure 5:
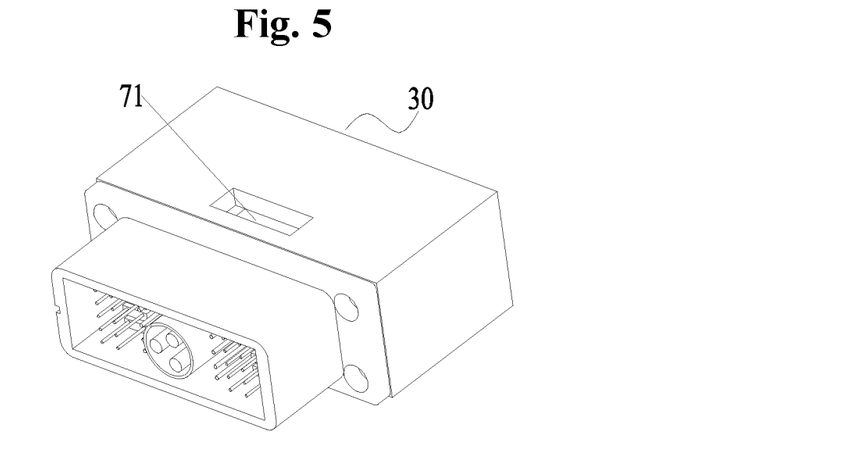
FIG. 5 shows a schematic diagram of a stereostructure of the second plugging portion of the connecting device in FIG. 1.
Figure 11:
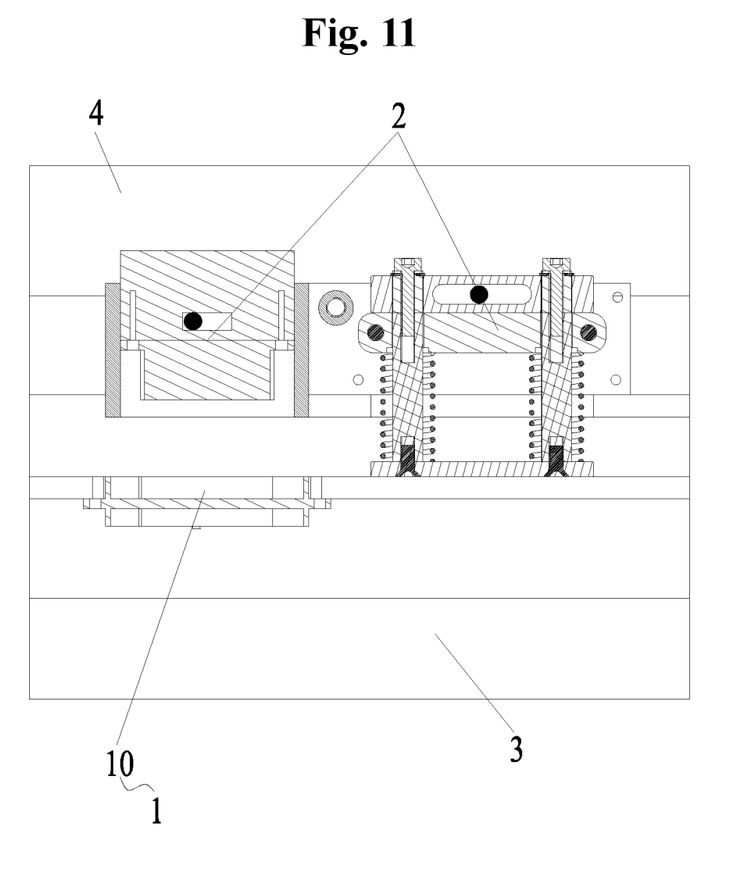
FIG. 11 shows a sectional schematic diagram of part of the LED display device in FIG. 8, wherein the second plugging portion of the connecting device is positioned at the extending position.
Figure 12:
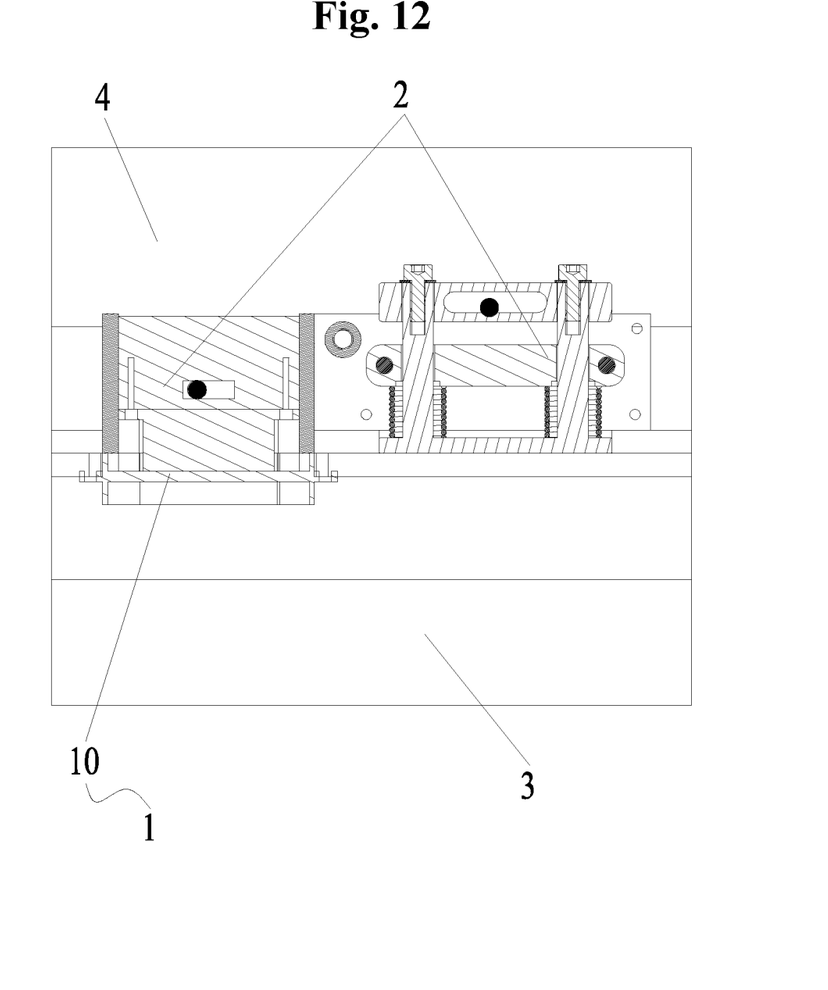
FIG. 12 shows a sectional schematic diagram of part of the LED display device in FIG. 8, wherein the second plugging portion of the connecting device is positioned at the retracting position.

As shown in FIGS. 1-4 and FIG. 7, the connecting device further includes a pin hole 76 and a third axis pin 77 penetrating the pin hole 76. In the embodiment, the third axis pin 77 is arranged on the fixed seat 20, the pin hole 76 is provided on the swinging rod 51, and an end of the third axis pin 77 is provided with a screw such that the swinging rod 51 is driven by the driving portion 40 to swing around the third axis pin 77. In the implementation shown in FIGS. 1-7, when the connecting device is not driven by an external force (the two LED boxes are disconnected), the driving portion 40 protrudes out of the side wall of the LED box (as shown in FIGS. 4 and 11). This arrangement has an advantage that the driving portion 40 is driven to move inwards directly by the side wall of the LED box such that the second plugging portion 30 is able to switch from the retracting position to the extending position. Preferably, the above connecting device is arranged between the two LED boxes adjacent vertically. As shown in FIGS. 11 and 12, when the LED boxes are assembled, the driving portion 40 of an upper LED box is in contact with a lower LED box. As the LED box moves downwards, the spring is compressed, the driving rod 41 moves upwards to drive the swinging rod 51 to move, a right end of the swinging rod 51 moves upwards, and a left end of the swinging rod 51 moves downwards to drive the second plugging portion 30 to move downwards. When two contact surfaces of the LED boxes coincide, the second plugging portion 30 and the first plugging portion 10 are plugged together.

Figure 10:
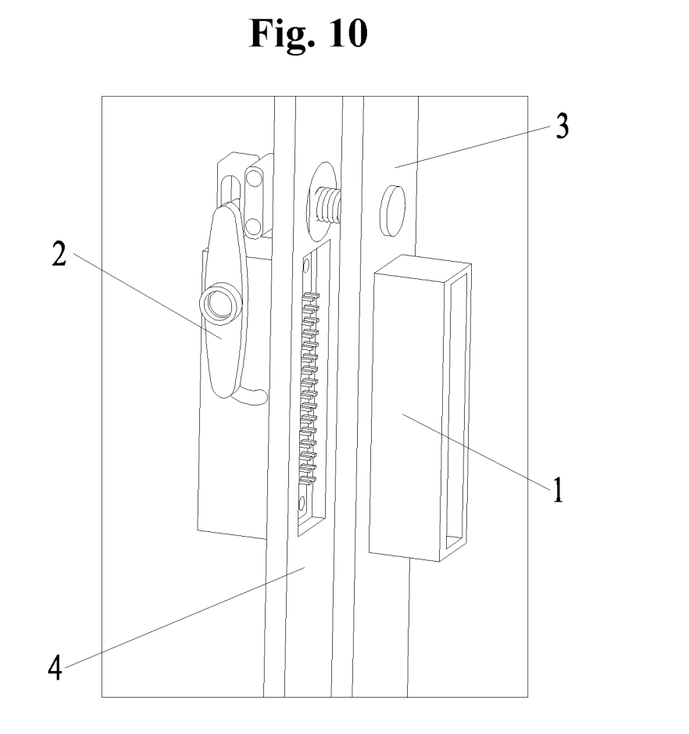
FIG. 10 shows an enlarged view of portion B of the LED display device in FIG. 8.

Of course, a person skilled in the art knows that in other implementations, when a connecting device is not driven by an external force (two LED boxes are disconnected), a driving portion is positioned in the LED box (as shown in FIG. 10). In this case, the LED box cooperating with the driving portion needs to be provided with an elastic triggering member, and the elastic triggering member is able to extend into the LED box to push the driving portion to move, such that a second plugging portion is driven to switch from a retracting position to an extending position. Preferably, the above connecting device is arranged between two LED boxes adjacent horizontally.

The disclosure further provides an LED display device. An embodiment of the LED display device is as shown in FIGS. 8-12. The display device includes: a first LED box 3, a second LED box 4 and a connecting device arranged between the first LED box 3 and the second LED box 4, wherein the connecting device is the above connecting device.

Figure 1:
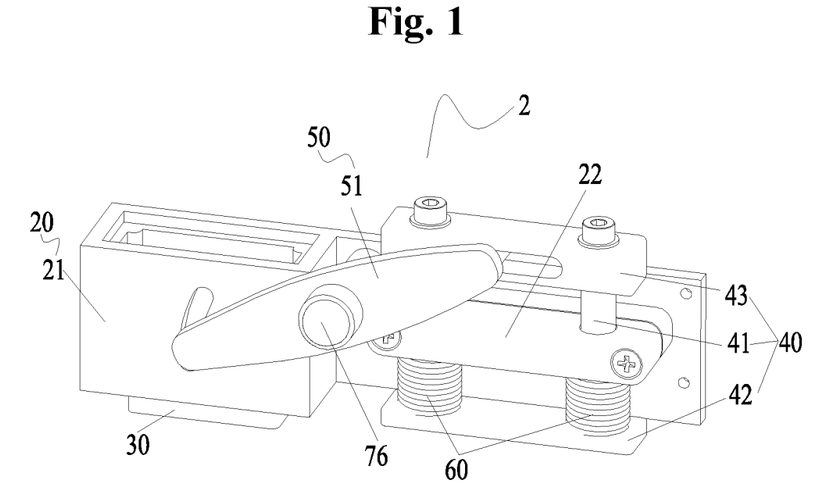
FIG. 1 shows a schematic diagram of a stereostructure according to an embodiment of a connecting device for light emitting diode (LED) boxes of the disclosure, wherein a second plugging portion of the connecting device is positioned at a retracting position.
Figure 2:
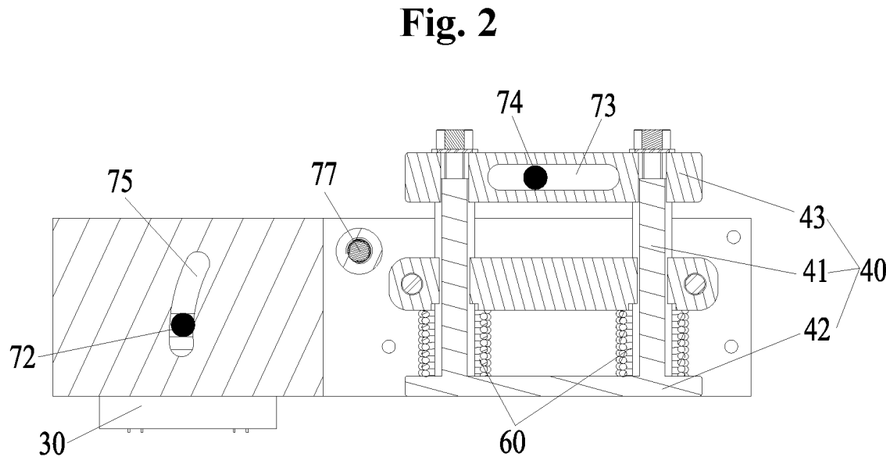
FIG. 2 shows a sectional schematic diagram of the connecting device in FIG. 1.
Figure 3:
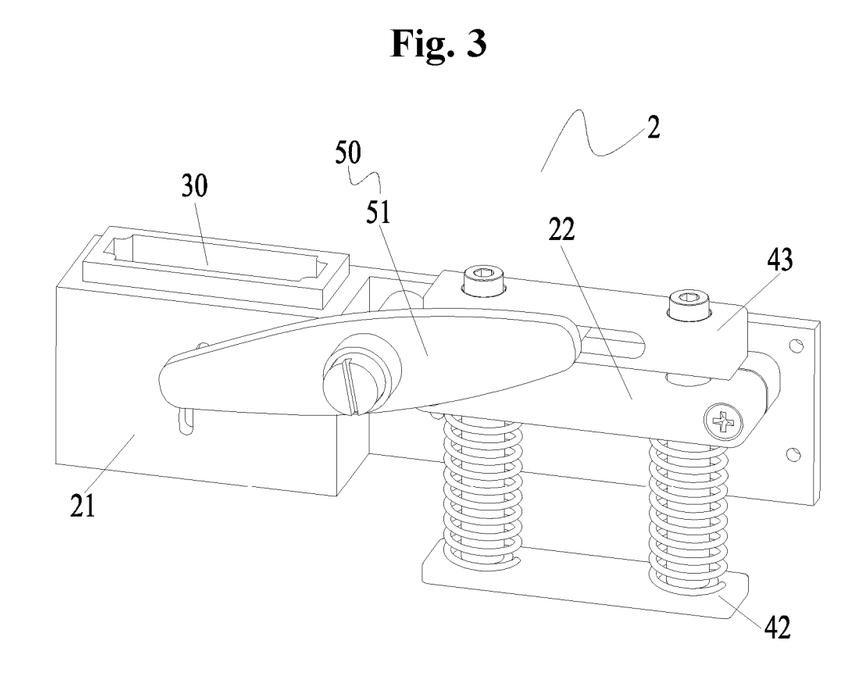
FIG. 3 shows a schematic diagram of a stereostructure of the connecting device in FIG. 1, wherein the second plugging portion of the connecting device is positioned at an extending position.

The first connecting assembly 1 of the connecting device is arranged on the first LED box 3, the second connecting assembly 2 of the connecting device is arranged on the second LED box 4, and a side wall of the second LED box 4 is provided with an opening for the second plugging portion 30 and a driving portion 40 of the connecting device to pass through. As shown in FIG. 1, in the embodiment, the fixed seat 20 of the connecting device is an independent component. One side of the first connecting assembly 1 of the connecting device of the embodiment is provided with the driving portion 40, the other side of the first connecting assembly 1 is provided with the second plugging portion 30, and the e driving portion and the second plugging portion are connected by the swinging rod 51. When the first LED box 3 and the second LED box 4 are assembled, the second plugging portion 30 is ejected out, such that the second plugging portion 30 is automatically connected with the first plugging portion 10 on the first LED box 3 in a pluggable manner. Moreover, the spring on the connecting device plays a damping and buffering role during assembly, such that the lamp beads will not be impacted due to sudden collisions or contact when the LED boxes are in contact. One of the first plugging portion 10 and the second plugging portion 30 is a male connector, and the other one of the first plugging portion 10 and the second plugging portion 30 is a female connector.

Moreover, corresponding positions the side walls of the first LED box 3 and the second LED box 4 are provided with magnet sheets, and during assembly, the magnet sheets attract each other such that the first LED box 3 and the second LED box 4 are butted together more easily.

As shown in FIG. 11, when the first LED box 3 and the second LED box 4 are not assembled together, the second plugging portion 30 is positioned in the second LED box 4, the spring is extended, the driving portion 40 extends out of the second LED box 4 through the opening, and when the second LED box 4 is transported or the first LED box 3 and the second LED box 4 are butted together, the driving portion 40 plays a buffering role. During assembly, as the side walls of the first LED box 3 and the second LED box 4 are gradually close to each other, the side wall of the first LED box 3 pushes the driving portion 40, and the spring is compressed, such that the driving portion 40 moves towards an interior of the second LED box 4 and drives the swinging rod 51 to move. The swinging rod 51 swings counterclockwise, the second end of the swinging rod 51 moves towards the interior of the second LED box, the first end of the swinging rod 51 moves towards an exterior of the second LED box, and the second plugging portion 30 is driven to extend out of the second LED box 4 through the opening, so as to cooperate with the first plugging portion 10 positioned on the first LED box 3 in a pluggable manner. As shown in FIG. 12, at this moment, the side walls of the first LED box 3 and the second LED box 4 are butted together, and the first plugging portion 10 and the second plugging portion 30 are plugged together to realize a power supply connection or a signal connection between the first LED box 3 and the second LED box 4, the driving portion 40 is positioned in the second LED box 4, and the spring is compressed.

In the embodiment, the second plugging portion 30 is provided with plugging pins, and the first plugging portion 10 is provided with a plug-in member for the plugging pins. When the first plugging portion 10 and the second plugging portion 30 are connected to each other in a pluggable manner, the plugging pins are in contact with the plug-in member, for the plugging pins, arranged at a corresponding position, so as to realize the power supply connection or the signal connection between the first LED box 3 and the second LED box 4.

When the LED display device is disassembled, under the action of elastic force of the spring, the abutting portion 42 pushes away the side wall, abutting against the abutting portion, of the first LED box, such that disassembly is easier.

Of course, in implementations not shown in the figures, a fixed seat of a connecting device is formed by part of structure of a second LED box.

In the description of the disclosure, it should be understood that orientation or positional relations indicated by orientation words such as "front", "back", "up", "down", "left", "right", "transverse", "vertical", "perpendicular", "horizontal", "top" and "bottom" are generally based on orientation or positional relations shown in the drawings, and are for the convenience of describing the disclosure and simplifying the description only. Unless otherwise stated, these orientation words do not indicate or imply that devices or elements indicated thereby must have particular orientations or be constructed and operated in particular orientations and therefore may not be construed as limiting the protection scope of the disclosure. Orientation words "inside" and "outside" refer to an inside and an outside relative to an outline of each component.

For ease of description, spatial relative terms such as "over", "above", "on an upper surface" and "on" may be used herein to describe spatial positional relations of one device or feature with other devices or features as shown in the figures. It should be understood that the spatial relative terms are intended to include different orientations in use or operation in addition to the orientations of the devices described in the figures. For example, if the device in the drawings is inverted, the device described as "above" or "over" other devices or structures would then be positioned "below" or "under" the other devices or structures. Thus, the illustrative term "above" may include two orientations of "above" and "below." The device may also be positioned in other different ways (being rotated by 90 degrees or being positioned at other orientations) and the spatial relative description used herein is interpreted accordingly.

In addition, it should be noted that the use of words such as "first" and "second" to define parts is only for the purpose of conveniently distinguishing corresponding parts. Unless otherwise stated, the above words do not have special meanings, and therefore may not be understood as limiting the protection scope of the disclosure.

What is described above is only as preferred embodiments of the disclosure and is not intended to limit the disclosure, and for those skilled in the art, the disclosure may be variously modified and changed. Any modifications, equivalent replacements, improvements, etc. made within the spirit and principle of the disclosure should fall within the protection scope of the disclosure.

What is claimed is:

1. A connecting device for light emitting diode (LED) boxes, comprising:
   a first connecting assembly, which comprises a first plugging portion; and
   a second connecting assembly, which comprises:
   a fixed seat,
   a second plugging portion movably arranged on the fixed seat and having an extending position in a plug-in cooperation with the first plugging portion and a retracting position separated from the first plugging portion,
   a driving portion movably arranged on the fixed seat, wherein the driving portion is connected with the second plugging portion through a linkage device, so as to drive the second plugging portion to move between the retracting position and the extending position, and
   an elastic reset member arranged between the fixed seat and the driving portion;
   wherein the linkage device comprises a swinging rod swingably arranged on the fixed seat, wherein a first end of the swinging rod is movably connected with the second plugging portion, and a second end of the swinging rod is movably connected with the driving portion;
   the fixed seat further comprises a second guide structure and the driving portion is guided by the second guide structure to move;
   the elastic reset member is a spring, the driving portion comprises a driving rod and an abutting portion positioned at a first end of the driving rod, the driving rod is arranged in the second guide structure, and the spring is sleeved on the driving rod and is positioned between the fixed seat and the abutting portion.

2. The connecting device as claimed in claim 1, further comprising a pin hole and a third axis pin penetrating the pin hole, wherein one of the pin hole and the third axis pin is arranged on the fixed seat, and the other one of the pin hole and the third axis pin is arranged on the swinging rod.

3. The connecting device as claimed in claim 1, further comprising a first sliding groove and a first axis pin arranged in the first sliding groove, wherein one of the first axis pin and the first sliding groove is arranged at the first end of the swinging rod, and the other one of the first axis pin and the first sliding groove is arranged on the second plugging portion; and the fixed seat further comprises a first guide structure, and the second plugging portion is guided by the first guide structure to move between the retracting position and the extending position.

4. The connecting device as claimed in claim 3, wherein the first guide structure is an accommodating housing, the second plugging portion is arranged in the accommodating housing, a third sliding groove is provided on the accommodating housing, and the first axis pin penetrates the third sliding groove.

5. The connecting device as claimed in claim 1, further comprising a second sliding groove and a second axis pin arranged in the second sliding groove, wherein one of the second axis pin and the second sliding groove is arranged at the second end of the swinging rod, and the other one of the second axis pin and the second sliding groove is arranged on the driving portion.

6. The connecting device as claimed in claim 5, wherein the driving portion comprises a driving rod and a blocking portion arranged at a second end of the driving rod, the driving rod is arranged in the second guide structure, the second axis pin is arranged at the second end of the swinging rod, and the second sliding groove is provided at the blocking portion.

7. An LED display device, comprising:
a first LED box, a second LED box and a connecting device arranged between the first LED box and the second LED box,
wherein the connecting device is the connecting device as claimed in claim 1.

8. The LED display device as claimed in claim 7, wherein the first connecting assembly of the connecting device is arranged on the first LED box, the second connecting assembly of the connecting device is arranged on the second LED box, a side wall of the second LED box is provided with an opening for the second plugging portion and the driving portion of the connecting device to pass through, and the fixed seat of the connecting device is an independent component or the fixed seat of the connecting device is formed by part of structure of the second LED box.

9. The LED display device as claimed in claim 7, further comprising a pin hole and a third axis pin penetrating the pin hole, wherein one of the pin hole and the third axis pin is arranged on the fixed seat, and the other one of the pin hole and the third axis pin is arranged on the swinging rod.

10. The LED display device as claimed in claim 7, further comprising a first sliding groove and a first axis pin arranged in the first sliding groove, wherein one of the first axis pin and the first sliding groove is arranged at the first end of the swinging rod, and the other one of the first axis pin and the first sliding groove is arranged on the second plugging portion; and the fixed seat further comprises a first guide structure, and the second plugging portion is guided by the first guide structure to move between the retracting position and the extending position.

11. The LED display device as claimed in claim 10, wherein the first guide structure is an accommodating housing, the second plugging portion is arranged in the accommodating housing, a third sliding groove is provided on the accommodating housing, and the first axis pin penetrates the third sliding groove.

12. The LED display device as claimed in claim 7, further comprising a second sliding groove and a second axis pin arranged in the second sliding groove, wherein one of the second axis pin and the second sliding groove is arranged at the second end of the swinging rod, and the other one of the second axis pin and the second sliding groove is arranged on the driving portion.

13. The LED display device as claimed in claim 12, wherein the driving portion comprises a driving rod and a blocking portion arranged at a second end of the driving rod, the driving rod is arranged in the second guide structure, the second axis pin is arranged at the second end of the swinging rod, and the second sliding groove is provided at the blocking portion.

* * * * *